J., C. C. AND H. WILLIAMS.
BRAKE ACTUATING MECHANISM FOR AUTOMOBILES.
APPLICATION FILED AUG. 27, 1920.

1,396,488.

Patented Nov. 8, 1921.
2 SHEETS—SHEET 1.

INVENTORS { JOHN WILLIAMS
CALVIN C. WILLIAMS
HENRY WILLIAMS }

BY THEIR ATTORNEY
Harry Smith

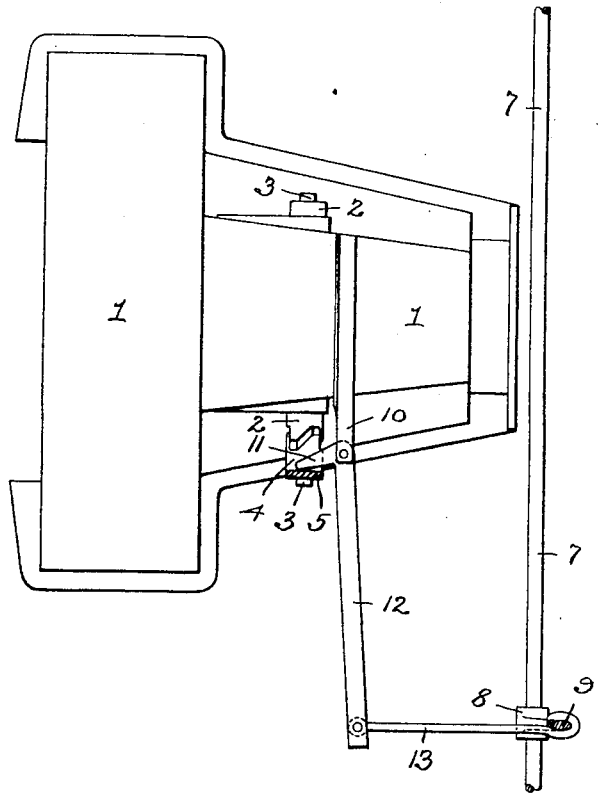

UNITED STATES PATENT OFFICE.

JOHN WILLIAMS, CALVIN C. WILLIAMS, AND HENRY WILLIAMS, OF PHILADELPHIA, PENNSYLVANIA.

BRAKE-ACTUATING MECHANISM FOR AUTOMOBILES.

1,396,488.  Specification of Letters Patent.  Patented Nov. 8, 1921.

Application filed August 27, 1920. Serial No. 406,434.

*To all whom it may concern:*

Be it known that we, JOHN WILLIAMS, CALVIN C. WILLIAMS, and HENRY WILLIAMS, citizens of the United States, residing in Philadelphia, Pennsylvania, have invented certain Improvements in Brake-Actuating Mechanism for Automobiles, of which the following is a specification.

Our invention relates to braking systems for automobiles, especially those of the well known "Ford" type. In such automobiles two brakes are provided, one, a "service" brake, adapted to be operated by means of a pedal, and the other, an "emergency" brake, adapted to be operated by means of a handle. It is recognized that advantageous results ensue from the simultaneous application of both brakes when an application of the emergency brake is necessary, and various means have been proposed for the purpose of automatically applying the service brake whenever the emergency brake is applied. The various mechanisms proposed, however, have all suffered, in greater or less degree, from the fact that their constructions were such as to require the exertion of considerably more power to simultaneously apply both brakes than is necessary to apply the emergency brake alone.

The object of our invention is to provide a braking connection of the character specified so constructed that the extra exertion of power required to effect a simultaneous application of both brakes will be reduced to a minimum. It will, in fact, be so little as to be barely noticeable. This object we accomplish in the manner hereinafter set forth, reference being had to the accompanying drawings, in which, Figure 1 is a top or plan view of the top member of the transmisison housing of a Ford automobile with sufficient showing of the brake actuating members to properly illustrate our invention. These members are illustrated in the positions occupied by them when the brakes are "off."

Fig. 2 is a similar view but with the parts illustrated in the positions occupied by them when the brakes are "on."

Figure 1:
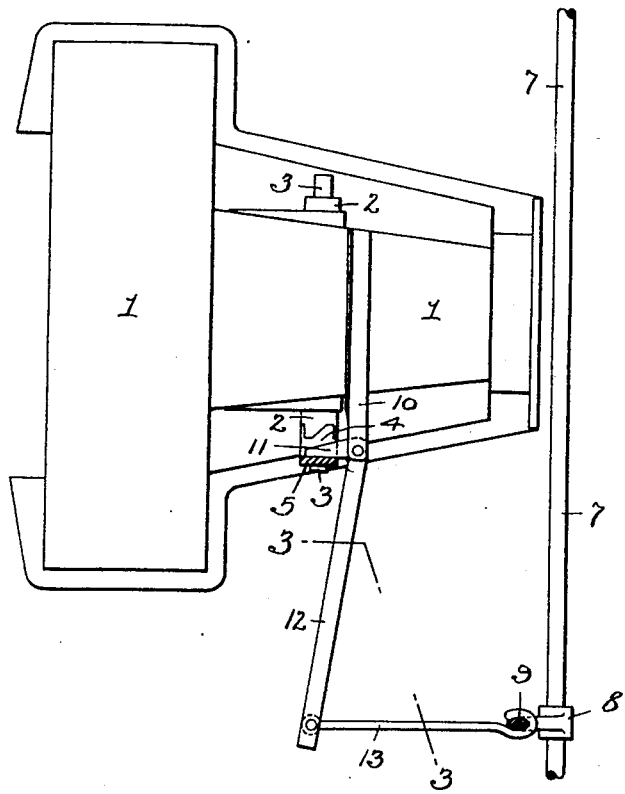
Figure 3:
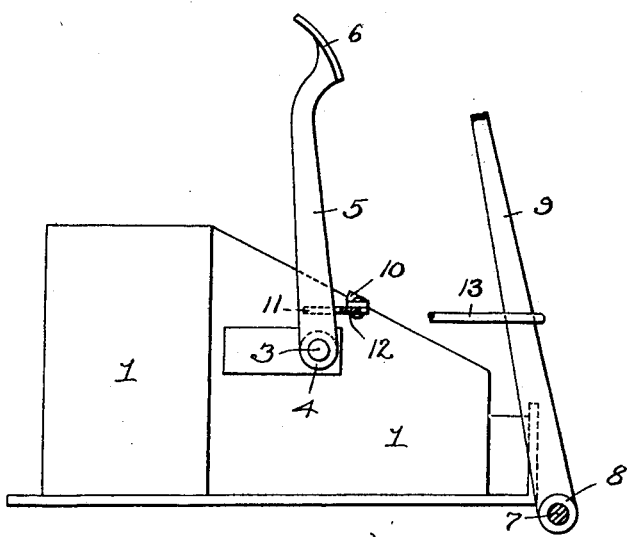
Fig. 3 is a side view of the parts in the positions illustrated in Fig. 1, this view being partly vertically sectional on the line 3—3, Fig. 1.

In the drawings is shown the top member 1 of the transmission housing, this top member being provided with oppositely disposed bearings 2 in which is rotatably and slidably mounted a shaft 3 which controls the service brake. Mounted at one end of the shaft 3 is a hub 4 from which projects, upwardly, an arm 5 to the outer end of which is secured a pedal 6 adapted to be depressed by the foot of the driver when it is desired to apply the service brake. Application of the service brake is effected as a result of the longitudinal movement of the shaft 3 through its bearings 2 and the manner in which the rocking of the shaft as the pedal 6 is depressed is caused to effect the necessary longitudinal movement is as follows:

That bearing 2 adjacent the hub 4 on the shaft 3 is provided, on its outer edge, with a beveled cam structure, as shown in Figs. 1 and 2. Coöperating with this cam structure is a similar, but reversed, cam structure on the inner edge of the hub 4. As the pedal 6 is depressed, with consequent rocking of the shaft 3, the action of the cam structures upon one another cause the shaft 3 to move longitudinally through its bearings thereby applying the service brake. A suitable spring device (not illustrated) is provided to normally maintain the parts in the positions shown in Fig. 1.

Properly located at the rear of and below the transmission housing is a transverse rock shaft 7, the function of which is to operate the emergency brake. In order that this shaft may be rocked it has mounted upon it a hub 8 from which projects, upwardly, a handle 9 adapted to be grasped and swung to the rear, manually, by the driver when it is desired to apply the emergency brake.

Hitherto, in all of the suggested constructions designed to automatically apply the service brake whenever the emergency brake was manually applied, it has been the endeavor of the designer to provide connecting mechanism between either the shaft 7 or its handle 9 and the pedal 6 or its arm 5 whereby, when the handle 9 was swung, manually, to rock the shaft 7 and apply the emergency brake, the pedal 6 would be automatically depressed with the consequent rocking and longitudinal movement of the shaft 3 and resultant application of the service brake. The greatest fault of such constructions, as developed in actual practice, has been the great amount of extra power that has had to be exerted to move the handle 9 when such movement had not only to apply the emergency brake but overcome the drag of the various elements of the service brake mechanism.

We have ascertained that, if the connecting mechanism is such that the shaft 3 be automatically moved, longitudinally, through its bearings 2 without any rocking movement whatever, the before referred to drag is largely eliminated and but little more power is necessary for the simultaneous application of both brakes through manual operation of the handle 9 than is necessary for the application of the emergency brake alone. Through taking advantage of the powers of leverage the extra exertion required is so reduced as to be almost negligible.

The connecting mechanism which we have designed will now be described. Rigidly mounted upon the upper face of the top member 1 of the transmission housing and projecting, laterally, therefrom is a bracket 10 to the outer end of which is pivoted a lever, a short arm 11 of which bears against the inner face of the pedal arm 5 and a long arm 12 of which is pivotally secured, at its extremity, to a link 13 the rear end of which is hooked about the emergency brake actuating handle 9. When the handle 9 is swung rearwardly, from the position shown in Fig. 1 to that shown in Fig. 2, to effect the application of the emergency brake, the link 13 pulls the long arm 12 of the lever rearwardly with consequent swing of the short arm 11 against the inner face of the pedal arm 5. The pedal arm is thereby moved, laterally, with resultant longitudinal movement of the shaft 3 and application of the service brake without any rocking of the shaft or depression of the pedal 6 being necessitated. Not only are these movements eliminated, but the frictional grip of the cam structures upon one another does not have to be overcome. By eliminating unnecessary movements and properly proportioning the lever 11—12, the object of our invention is attained.

We claim:

1. The combination, in an automobile, of a longitudinally movable service brake rock shaft, an emergency brake rock shaft, and connecting mechanism therebetween whereby, when said emergency brake rock shaft is rocked, said service brake rock shaft is longitudinally moved without being rocked.

2. The combination, in an automobile, of a longitudinally movable service brake rock shaft, a pedal arm thereon, an emergency brake rock shaft, an operating handle thereon, and connecting mechanism between said pedal arm and said operating handle whereby, when said operating handle is moved to rock said emergency brake rock shaft, said pedal arm is moved laterally with consequent longitudinal movement of said service brake rock shaft but without rocking thereof.

3. The combination, in an automobile, of a longitudinally movable service brake rock shaft, a pedal arm thereon, an emergency brake rock shaft, an operating handle thereon, and connecting mechanism between said pedal arm and said operating handle, said connecting mechanism comprising a pivoted lever one arm of which bears against the inner face of said pedal arm and the other arm of which is connected to said operating handle by means of a link.

4. The combination, in an automobile, of a longitudinally movable service brake rock shaft, a pedal arm thereon, an emergency brake rock shaft, an operating handle thereon, and connecting mechanism between said pedal arm and said operating handle, said connecting mechanism comprising a pivoted lever having a short arm and a long arm, the short arm bearing against the inner face of said pedal lever and the long arm being connected to said operating handle by means of a link.

In testimony whereof we have signed our names to this specification.

JOHN WILLIAMS.
CALVIN C. WILLIAMS.
HENRY WILLIAMS.